(12) United States Patent
Campbell et al.

(10) Patent No.: US 7,720,763 B2
(45) Date of Patent: May 18, 2010

(54) SYSTEM AND METHOD FOR PROVIDING SUPPLEMENTAL TRANSACTION PROCESSING SERVICES TO USERS OF A PRIMARY FINANCIAL SERVICES SYSTEM

(75) Inventors: Eric Campbell, Rye, NH (US); Maris N Lemanis, Smithtown, NY (US)

(73) Assignee: Bottomline Technologies (de), Inc., Portsmouth, NH (US)

( * ) Notice: Subject to any disclaimer, the term of this patent is extended or adjusted under 35 U.S.C. 154(b) by 223 days.

(21) Appl. No.: 11/999,537

(22) Filed: Dec. 6, 2007

(65) Prior Publication Data

US 2009/0150287 A1 Jun. 11, 2009

(51) Int. Cl.
*G06Q 40/00* (2006.01)
(52) U.S. Cl. .......................... 705/44; 705/39
(58) Field of Classification Search ................... 705/44, 705/36–38, 40; 704/44
See application file for complete search history.

(56) References Cited

U.S. PATENT DOCUMENTS

2002/0138431 A1* 9/2002 Antonin et al. .............. 705/42
2005/0010575 A1* 1/2005 Pennington ................. 707/100

OTHER PUBLICATIONS

Traffic Analysis of a Web Proxy Caching Hierarchy. Anirban Mahanti et al., University of Saskatchewan, IEEE Network, May/Jun. 2000.*

* cited by examiner

*Primary Examiner*—Hani M. Kazimi
*Assistant Examiner*—Clifford Madamba
(74) *Attorney, Agent, or Firm*—Timothy P O'Hagan

(57) ABSTRACT

A supplemental financial transaction processing system operates in conjunction with one or more primary financial services systems for purposes of providing supplemental financial transaction processing services to users of the primary financial services system. The supplemental financial transaction processing system comprises a secure web services system and a supplemental transaction server. The secure web services system comprises at least one financial transaction method available to the primary financial services system. Upon receipt of a method call for a financial transaction, the supplemental financial transaction processing system: i) associates a unique redirect URL to the method call; and ii) returns the unique redirect URL to the primary financial services system. The primary financial services system may then pass the unique redirect URL through a secure connection with its client. The supplemental transaction server, upon a client requesting an HTTPS connection to the unique redirect URL, verifies the validity of the unique redirect URL. If valid, a web document object is provided for rendering by the client. The web document object comprises: i) the financial institution defined transaction values (at least one); ii) user interface control script for rendering of controls for obtaining user entry of at least one client defined transaction value; and iii) transaction control script. The transaction control script comprises instructions for i) creating a financial transaction; ii) validating the financial transaction; and iii) posting the validated transaction back to the supplemental financial transaction server.

12 Claims, 14 Drawing Sheets

| Summary | Electronic Documents | Bill Pay | Transfer Funds | Wire Transfer    Print page | Help

Deposit Accounts:

| Name | Number | Current Balance | Available Balance |
|---|---|---|---|
| Checking | 924199 | $1,267.96 | $1,267.96 |
| Savings | 000097 | $12,810.88 | $12,810.88 |

Loan Accounts:

| Name | Number | Current Balance | Amount Due |
|---|---|---|---|
| Auto Loan | 4098562023 | $15,750.00 | $438.00 |
| Home Equity | 0985982834 | $53,381.00 | $785.34 |

Credit Cards:

| Name | Number | Current Balance | Amount Due |
|---|---|---|---|
| Master Card | xxxx-xxxx-xxxx-2714 | $1,758.00 | |

Summary | Electronic Documents | Bill Pay | Transfer Funds || Wire Transfer          Print page | Help

137 ——————————————— 138 ——————

Deposit Accounts:

| Name     | Number  | Current Balance | Available Balance |
|----------|---------|-----------------|-------------------|
| Checking | 924199  | $1,267.96       | $1,267.96         |
| Savings  | 000097  | $12,810.88      | $12,810.88        |

222a        222b        222c
                                    222d

Transfer Funds

From: [Select Account ▶]  → Checking 924199
To:   [Select Account ▶]     Savings 000097
Date: [         ] 🗓              225
Amount: [     ]

[Transfer] [Cancel]
   224

223

| URL 58 | | Time Stamp 74 | F.I. ID 48 | Type ID 50 | PSDV 49 | |
|---|---|---|---|---|---|---|
| ID 42 | Auth 44 | | | | PS Defined Transaction Values 52 | PS Defined Validation Values 54 |
| | | | | | | |
| | | | | | | |
| | | | | | | |

Redirect Database 100

Style Sheet Database 22

| F.I. ID 48 | Style Sheet Parameters 104 | | | |
|---|---|---|---|---|
| | Background Color 104a | Font Color 104b | Font Style 104c | Other Parameters 104d |
| | | | | |
| | | | | |
| | | | | |

US 7,720,763 B2

SYSTEM AND METHOD FOR PROVIDING SUPPLEMENTAL TRANSACTION PROCESSING SERVICES TO USERS OF A PRIMARY FINANCIAL SERVICES SYSTEM

TECHNICAL FIELD

The present invention relates to providing financial transaction processing services, and more particularly, to a system and method wherein a supplemental financial transaction processing system provides transaction processing services to users of a primary financial services web interface system.

BACKGROUND OF THE INVENTION

Banks and other financial institutions utilize a web interface system for providing a web site through which the financial institutions customers may obtain with online web access to their accounts.

The typical architecture 200 utilized for providing a Bank's consumer customers with online account access is as shown in FIG. 1. The architecture 200 generally comprises a plurality of web servers 210 providing an online user interface to customers. The web servers 210 are staged in what is typically known as a demilitarized zone (DMZ) 206 such that customers, operating a web browser on a client computer system 204, may establish a secure connection to the web servers 210 over the public internet 202.

Generally the web servers 210 form a front-end facade for a secure application server 212. The secure application server 212 drives the web servers 210 to provide web pages to each client system 204 for purposes of authenticating the user of the client system 204 and, once authenticating, enabling the user to access their accounts and perform the various functions supported by the web application server 212.

The secure application server 212 is staged within a secure network 208 and, through such network 208, may interface with the banks' back end systems 214. The back end systems 214 may include systems which control user authentication and systems which hold and manage the account data. Data obtained from back end systems 214 may be populated into web pages provided to the client system 204 and transactions initiated through a client system 204 may be validated by the web application server 214 and input to the bank end systems 214. The interfaces between the web application server 212 and the bank back end systems 214 (e.g. file formats and data schema) may be proprietary in nature.

For purposes of implementing a bank's consumer web site, the secure application server 212 may be, or may be similar to, a typical Automated Teller Machine (ATM) application server. For that reason the functions that can be accessed through the bank's consumer web site are typically limited to those functions that are supported by a typical ATM application. Traditional examples include viewing account balances, viewing statements, and transferring funds between accounts. More recent additions that have become common include initiating Automated Clearing House (ACH) debit and credit transactions to accounts held by other financial institutions.

Within the financial industry there exist many types of financial transactions that most banks do not support through their consumer web sites. The International Organization for Standardization developed ISO 20022 which defines a Universal Financial Industry Messaging Scheme (UNIFI). UNIFI comprises a standardize XML syntax for a vast quantity of standard financial transactions ranging from foreign payment transactions, local and state tax payment transactions, securities trade and settlement transactions, and etcetera.

In most cases, it is not cost effective for a bank to "build out" its web application server 212 of its consumer web site to support diverse financial transaction types because the volume of usage would be too low to justify the build out costs. For example, even domestic wire transactions, which are only occasionally used by consumer customers, are not typically supported by a bank's consumer web site.

What is needed is a system and method that enables a bank's customers to execute transactions that are not supported by the bank's web application server (e.g. supplemental transactions) in a seamless manner. What is needed is a system and method that enables a bank to make transaction types available to its customers through the bank's website application server even though such transactions are not of a type that can be created and validated by the bank's web application server.

SUMMARY OF THE INVENTION

A first aspect of the present invention comprises a supplemental financial transaction processing system operating in conjunction with one or more primary financial services systems. The purpose of the supplemental financial transaction processing system to provide financial transaction processing services (e.g. process supplemental transaction) for users of the primary financial services system.

The supplemental financial transaction processing system comprises a secure web services system and a supplemental transaction server. The secure web services system comprises at least one financial transaction method available to the primary financial services system. In operation, the secure web services system receives a method call for a one of the financial transaction methods.

The method call comprises, (in accordance with an applicable WSDL) elements comprising at least the following information: i) a financial institution identifier identifying the primary financial services system initiating the method call; and ii) at least one financial institution defined transaction value. Additionally, the method call may further comprise at least one financial institution defined validation value.

Upon receipt of a method call, the supplemental financial transaction processing system: i) associates a unique redirect URL to the method call; and ii) returns the unique redirect URL to the primary financial services system.

After return of the unique redirect URL to the primary financial services system, the primary financial service system passes the redirect URL through its secure connection with its client.

The unique redirect URL includes a core URL (e.g. domain name portion) and a URL extension. The core URL is associated with an exposed interface of the supplemental transaction server such that, after receipt of the redirect URL associated with a frame within a web page provided by the primary financial services system to the client, the client may establish a secure hypertext transport protocol (HTTPS) connection to the supplemental transaction server. The extension distinguishes the unique redirect URL form other unique redirect URLs provided in response to other method calls.

The supplemental transaction server, upon a client requesting an HTTPS connection to its exposes interface at the core URL, verifies the validity of the unique redirect URL by verification/authentication of the extension values. If valid, the supplemental transaction server provides a web document object for rendering by the client within the frame of the web page provided by the primary financial services system.

The web document object comprises: i) the financial institution defined transaction values (at least one); ii) user interface control script for rendering of controls for obtaining user entry of at least one client defined transaction value; and iii) transaction control script.

The transaction control script comprises instructions for i) creating a financial transaction; ii) validating the financial transaction; and iii) posting the validated transaction back to the supplemental financial transaction server.

Creating the transaction comprises at least populating the financial institution defined transaction value and the at least one client defined transaction value into a template for the type of transaction for which the method call was initiated.

Validating the transaction comprises executing at least one validation rule for validating the financial transaction. The at least one validation rule may define a comparison of the result of a mathematical function of the client defined transaction value to: i) the financial institution defined validation value to determine whether the client defined transaction value is valid (for example a client defined payment amount not exceeding the account balance); or ii) or other validation values defined within the web document object (for example a schedule transaction date being a business date).

Upon receiving a post of the validated financial transaction in response to provision of the web document object, the supplemental transaction server performs at least one of: i) writing the financial transaction to a transaction database; and ii) forwarding the financial transaction to a processing system distinct from the supplemental transaction processing system. Such distinct processing system may be: i) the primary financial services system originally making the method call, ii) a different system operated by the financial institution controlling the primary financial services system; or iii) a third party system.

In one sub embodiment, the supplemental transaction processing system may associate a time period during which the unique redirect URL is valid (e.g. a time out window following the creation of the unique redirect URL in response to a method call) for security purposes. The client must connect to the unique redirect URL within the time period—and the supplemental transaction server only provides the web document object in response to receiving a secure connection at the unique redirect URL if the connection is received during the time in which the unique redirect URL is valid.

This provides a layer of securing in that it limits the time period during which a potential hacker could attempt to form connections and obtain web document objects by "guessing" a unique redirect URLs.

In a sub embodiment wherein the supplemental transaction processing system supports more than one primary financial services system, the supplemental transaction processing system may further comprise a style sheet database.

The style sheet database associates each of the supported primary financial services system (or more accurately the financial institution identifier of each of the supported primary financial services system) with a style sheet. The purpose of the style sheet is to enable the client system to render the web document object with the same "look and feel" as the web pages provided by the primary financial services system.

As such, the style sheet defines at least one of font style, a font color, and background color which may match at least one of a font style, a font color, and a background color of the web page provided by the primary financial services system.

As such, in operation, the supplemental transaction server, upon receiving a connection from a client system on the unique redirect URL, further: i) obtains the style sheet from the style sheet database that is associated with the financial institution identifier of the method call; and ii) provides such style sheet in conjunction with the web document object. As such, the user interface control script renders the web document object, including the controls for obtaining user entry of at least one client defined transaction value, in accordance with the style sheet provided by the supplemental transaction server.

A second aspect of the present invention comprises a system for providing financial transaction processing services to users of a primary financial services system. The system comprises both the primary financial services system and a supplemental financial transaction system.

The primary financial services system may be a financial institutions web site which comprises servers coupled to the internet for enabling client access to the clients accounts. More particularly, the primary financial services system may: i) receive a secure connection (e.g. HTTPS) from a client system; ii) authenticate a user of the client system; and iii) provide a menu driven sequence of web pages to the client system to facilitate user management of entitled accounts.

At least one web page may enable a user to select one of a core financial transaction and a supplemental financial transaction. A core transaction comprises a transaction supported by the primary financial services system such that the primary financial services system includes systems for obtaining client defined transaction values, validating, and posting the core transaction to back end systems of the primary financial services system.

A supplemental transaction comprises a transaction where client defined transaction values are obtained and validated by the supplemental financial transaction system—which is distinct from the primary financial services system;

As such, upon receiving an indication of user selection of a core financial transaction, the primary financial services system provides a user interface object associated with the core financial transaction. The user interface object comprises core transaction user interface control script for rendering of controls for obtaining user entry of at least one core transaction value and posting the client defined core transaction value back to the primary financial services system.

However, upon the primary financial services system receiving an indication of user selection of a supplemental financial transaction, the primary financial services system generates a method call to a secure web services system of the supplemental financial transaction processing system.

The method call complies with a WSDL of the supplemental financial transaction system and includes elements comprising at least the following information: i) a financial institution identifier identifying the primary financial services system initiating the method call; and ii) at least one financial institution defined transaction value. Additionally, the method call may further comprise at least one financial institution defined validation value.

Upon receiving a unique redirect URL from the supplemental financial transaction processing system in response to the method call, the primary financial services system provides a supplemental transaction web page to the client system.

The supplemental transaction web page comprises the unique redirect URL in association with script directing the client system to obtain content from the unique redirect URL for rendering.

The unique redirect URL includes a core URL (e.g. domain name portion) that associates with a supplemental transaction server of the supplemental financial transaction system and an extension distinguishing the unique redirect URL with unique redirect URLs provided in response to other method calls.

In response to receiving a secure connection request at the unique redirect URL, the supplemental transaction server verifies the validity of the unique redirect URL and provides a web document object to the client for rendering.

The web document object comprises: i) the at least one financial institution defined transaction value; ii) user interface control script for rendering of controls for obtaining user entry of at least one client defined transaction value; and iii) transaction control script.

The transaction control script comprises instructions for i) creating a financial transaction; ii) validating the financial transaction; and iii) posting the validated transaction back to the supplemental financial transaction server.

Creating the transaction comprises at least populating the financial intuition defined transaction value and the at least one client defined transaction value into a template for the type of transaction for which the method call was initiated.

Validating the transaction comprises executing at least one validation rule for validating the financial transaction. The at least one validation rule may define a comparison of the result of a mathematical function of the client defined transaction value to: i) the financial institution defined validation value to determine whether the client defined transaction value is valid (for example a client defined payment amount not exceeding the account balance); or ii) or other validation values defined within the web document object (for example a schedule transaction date being a business date).

Upon receiving a post of the validated financial transaction in response to provision of the web document object, the supplemental transaction server performs at least one of: i) writing the financial transaction to a transaction database; and ii) forwarding the financial transaction to a processing system distinct from the supplemental transaction processing system. Such distinct processing system may be: i) the primary financial services system originally making the method call, ii) a different system operated by the financial institution controlling the primary financial services system; or iii) a third party system.

Again, in one sub embodiment, the supplemental transaction processing system may associate a time period during which the unique redirect URL is valid (e.g. a time out window following the creation of the unique redirect URL in response to a method call) for security purposes. The client must connect to the unique redirect URL within the time period—and the supplemental transaction server only provides the web document object in response to receiving a secure connection at the unique redirect URL if the connection is received during the time in which the unique redirect URL is valid.

Again, in a sub embodiment wherein the supplemental transaction processing system supports more than one primary financial services system, the supplemental transaction processing system may further comprise a style sheet database.

The style sheet database associates each of the supported primary financial services system (or more accurately the financial institution identifier of each of the supported primary financial services system) with a style sheet. The purpose of the style sheet is to enable the client system to render the web document object with the same "look and feel" as the web pages provided by the primary financial services system.

As such, the style sheet defines at least one of font style, a font color, and background color which may match at least one of a font style, a font color, and a background color of the web page provided by the primary financial services system.

As such, in operation, the supplemental transaction server, upon receiving a connection from a client system on the unique redirect URL, further: i) obtains the style sheet from the style sheet database that is associated with the financial institution identifier of the method call; and ii) provides such style sheet in conjunction with the web document object. As such, the user interface control script renders the web document object, including the controls for obtaining user entry of at least one client defined transaction value, in accordance with the style sheet provided by the supplemental transaction server.

In a third aspect of the present invention comprises a supplemental financial transaction processing system for providing financial transaction processing services to users of at least two distinct primary financial services systems.

The supplemental financial transaction processing system comprises a secure web services interface and a supplemental transaction server.

The secure web services interface comprises at least one financial transaction method available to each of the two primary financial services systems. In operation, the secure web services interface receives a first method call from a first of the primary financial services systems and receives a second method call from a second of the primary financial services systems.

The first method call complies with a WSDL of the supplemental financial transaction system and includes elements comprising at least the following information: i) a financial institution identifier identifying the first of the primary financial services systems; and ii) at least one financial institution defined transaction value established by the first of the primary financial services systems. Additionally, the method call may further comprise at least one financial institution defined validation value established by the first of the primary financial services systems.

Similarly, the second method call complies with the WSDL of the supplemental financial transaction system and includes elements comprising at least the following information: i) a financial institution identifier identifying the second of the primary financial services systems; and ii) at least one financial institution defined transaction value established by the second of the primary financial services systems. Additionally, the method call may further comprise at least one financial institution defined validation value established by the second of the primary financial services systems.

In response to receipt of the first method call, the secure web service system: i) generates a first unique redirect URL; and ii) stores an indication of the first unique redirect URL in association with at least one financial institution defined transaction value established by the first primary financial services system (and the other information provided in the first method call); and iii) provides the first unique redirect URL to the first primary financial services system in response to the first method call.

Similarly, in response to receipt of the second method call, the secure web service system: ) generates a second unique redirect URL; and ii) stores an indication of the second unique redirect URL in association with at least one financial institution defined transaction value established by the second primary financial services system (and the other information provided in the second method call); and iii) provides the second unique redirect URL to the second primary financial services system in response to the second method call.

Both the first unique redirect URL and the second unique redirect URL may: i) include a common core URL (e.g.

domain name portion) associated with the supplemental transaction server; and ii) unique extension portions.

The supplemental transaction serve receives a first secure connection at the first unique redirect URL from a first client system and, if the first unique redirect URL is valid, provides a first web document object in response thereto.

The first web document object comprises: i) the at least one financial institution defined transaction value established by the first of the primary financial services system; ii) user interface control script for rendering of controls for obtaining user entry of at least one client defined transaction value; and iii) transaction control script.

Similarly, the supplemental transaction serve receives a second secure connection at the second unique redirect URL from a second client system and, if the second unique redirect URL is valid, provides a second web document object in response thereto.

The second web document object comprises: i) the at least one financial institution defined transaction value established by the second of the primary financial services system; ii) the user interface control script for rendering of controls for obtaining user entry of at least one client defined transaction value; and iii) the transaction control script.

The transaction control script comprises instructions for i) creating a financial transaction; ii) validating the financial transaction; and iii) posting the validated transaction back to the supplemental financial transaction server.

Creating the transaction comprises at least populating the financial intuition defined transaction value included in the web document object and the at least one client defined transaction value into a template for the type of transaction for which the method call was initiated.

Validating the transaction comprises executing at least one validation rule for validating the financial transaction. The at least one validation rule may define a comparison of the result of a mathematical function of the client defined transaction value to: i) the financial institution defined validation included in the web document object to determine whether the client defined transaction value is valid (for example a client defined payment amount not exceeding the account balance); or ii) or other validation values defined within the web document object (for example a schedule transaction date being a business date). The other validation values may be common to both the first web document object and the second web document object.

Upon receiving a post of the validated financial transaction in response to provision of the first web document object, the supplemental transaction server performs at least one of: i) writing the financial transaction to a transaction database; and ii) forwarding the financial transaction to a first processing system distinct from the supplemental transaction processing system. Such first distinct processing system may be: i) the first of the primary financial services systems originally making the method call, ii) a different system operated by the financial institution controlling the first of the primary financial services system; or iii) a third party system.

Similarly, upon receiving a post of the validated financial transaction in response to provision of the second web document object, the supplemental transaction server performs at least one of: i) writing the financial transaction to the transaction database; and ii) forwarding the financial transaction to a second processing system distinct from the supplemental transaction processing system. Such second processing system may be: i) the second of the primary financial services systems originally making the method call, ii) a different system operated by the financial institution controlling the second of the primary financial services system; or iii) the third party system.

Again, in one sub embodiment, the supplemental transaction processing system may associate, with each unique redirect URL, a time period during which such unique redirect URL is valid (e.g. a time out window following the creation of the unique redirect URL in response to a method call) for security purposes. The client must connect to the unique redirect URL within the time period—and the supplemental transaction server only provides the applicable web document object in response to receiving a secure connection at the unique redirect URL if the connection is received during the time in which the unique redirect URL is valid.

Again, the processing system may further comprise a style sheet database. The style sheet database associates a first style sheet with the first primary financial services system and a second style sheet with the second primary financial services system.

The first style sheet defines at east one of a font style, font color, and background color associated with a first financial institution operating the first of the primary financial services system—and which match at least one of a font style, a font color, and a background color of web pages provided by the first of the primary financial services systems.

Similarly, the second style sheet, distinct from the first style sheet, defines at east one of a font style, font color, and background color associated with a second financial institution operating the second of the primary financial services system—and which matches at least one of a font style, a font color, and a background color of web pages provided by the second of the primary financial services systems.

As such, in operation, the supplemental transaction server, upon receiving a connection from a client system on the unique redirect URL, further: i) obtains the style sheet from the style sheet database that is associated with the financial institution identifier of the method call; and ii) provides such style sheet in conjunction with the web document object. As such, the user interface control script renders the web document object, including the controls for obtaining user entry of at least one client defined transaction value, in accordance with the style sheet provided by the supplemental transaction server.

Another aspect of the invention comprises a method for providing a financial secure transaction to a client via a supplemental financial transaction server. The method involves receiving a method call that comprises: a financial institution identifier identifying the primary financial services system initiating the method call; and at least one financial institution defined transaction value identifying the type of transaction method available to the primary financial services system. The method further includes associating a unique redirect URL to the method call; sending the unique redirect URL to a primary financial services system; and receiving a connection with a client system at the unique redirect URL. The method further includes providing to the client a web document object comprising: the at least one financial institution defined transaction value; user interface control script adapted to render controls for obtaining user entry of at least one client defined transaction value; and transaction control script.

The transaction control script is adapted to: create a financial transaction from the at least one financial institution defined transaction value and the at least one client defined transaction value; and post the financial transaction back to the supplemental transaction server.

The post of the financial transaction containing information identifying the at least one financial institution defined transaction value and the at least one client defined transaction value is then received, after which at least one of the following processes is performed: i) writing the financial transaction to a transaction database or ii) forwarding the financial transaction to a processing system distinct from the supplemental financial transaction server.

In addition, the method call may further include at least one financial institution defined validation value and the transaction control script may be further adapted to: validate the client defined transaction value by executing at least one validation rule comprising comparing the result of a mathematical function of the client defined transaction value to the financial institution defined validation value; and post the financial transaction to the supplemental transaction server only upon successful validation of the client defined transaction value.

For a better understanding of the present invention, together with other and further aspects thereof, reference is made to the following description, taken in conjunction with the accompanying drawings, and its scope will be pointed out in the appended claims.

BRIEF DESCRIPTION OF THE DRAWINGS

FIG. 4 is a diagram of a web page provided as part of a menu driven sequence of web pages in accordance with one embodiment of the present invention;

FIG. 5 is a diagram of a web page provided as part of a menu driven sequence of web pages in accordance with one embodiment of the present invention.

FIG. 12 is a diagram representing exemplary data relationships stored in a redirect database in accordance with one embodiment of the present invention;

FIG. 13 is a diagram representing exemplary data relationships stored in a style sheet database in accordance with one embodiment of the present invention.

DETAILED DESCRIPTION OF THE INVENTION

Figure 1:
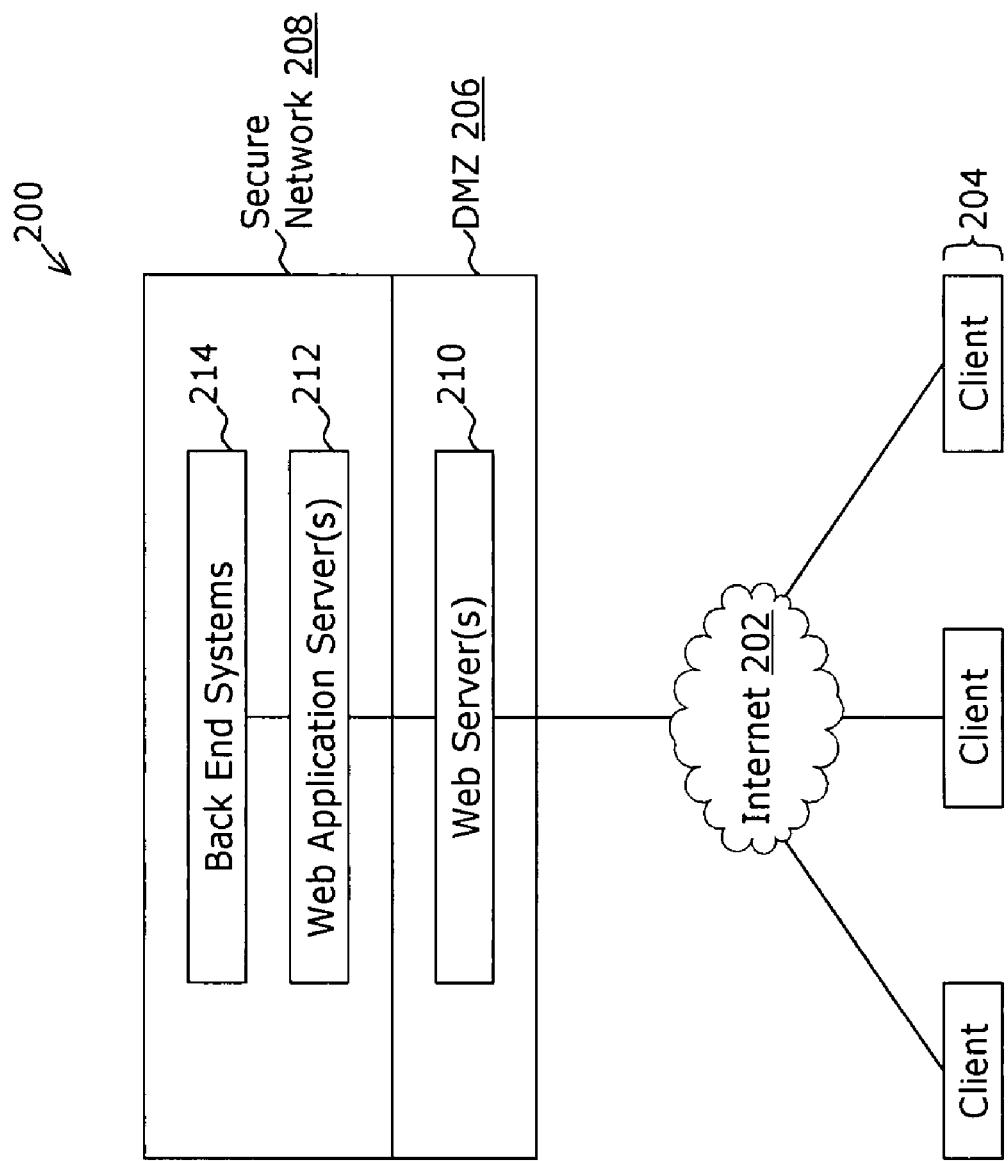
FIG. 1 is a block diagram of a traditional architecture of systems utilized for providing a online account access to customers of a financial institution.

The present invention is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in hardware circuit(s), a processor executing software code, or a combination of a hardware circuit and a processor executing code. As such, the term circuit as used throughout this specification is intended to encompass a hardware circuit (whether discrete elements or an integrated circuit block), a processor executing code, or a combination of a hardware circuit and a processor executing code, or other combinations of the above known to those skilled in the art.

Figure 2:
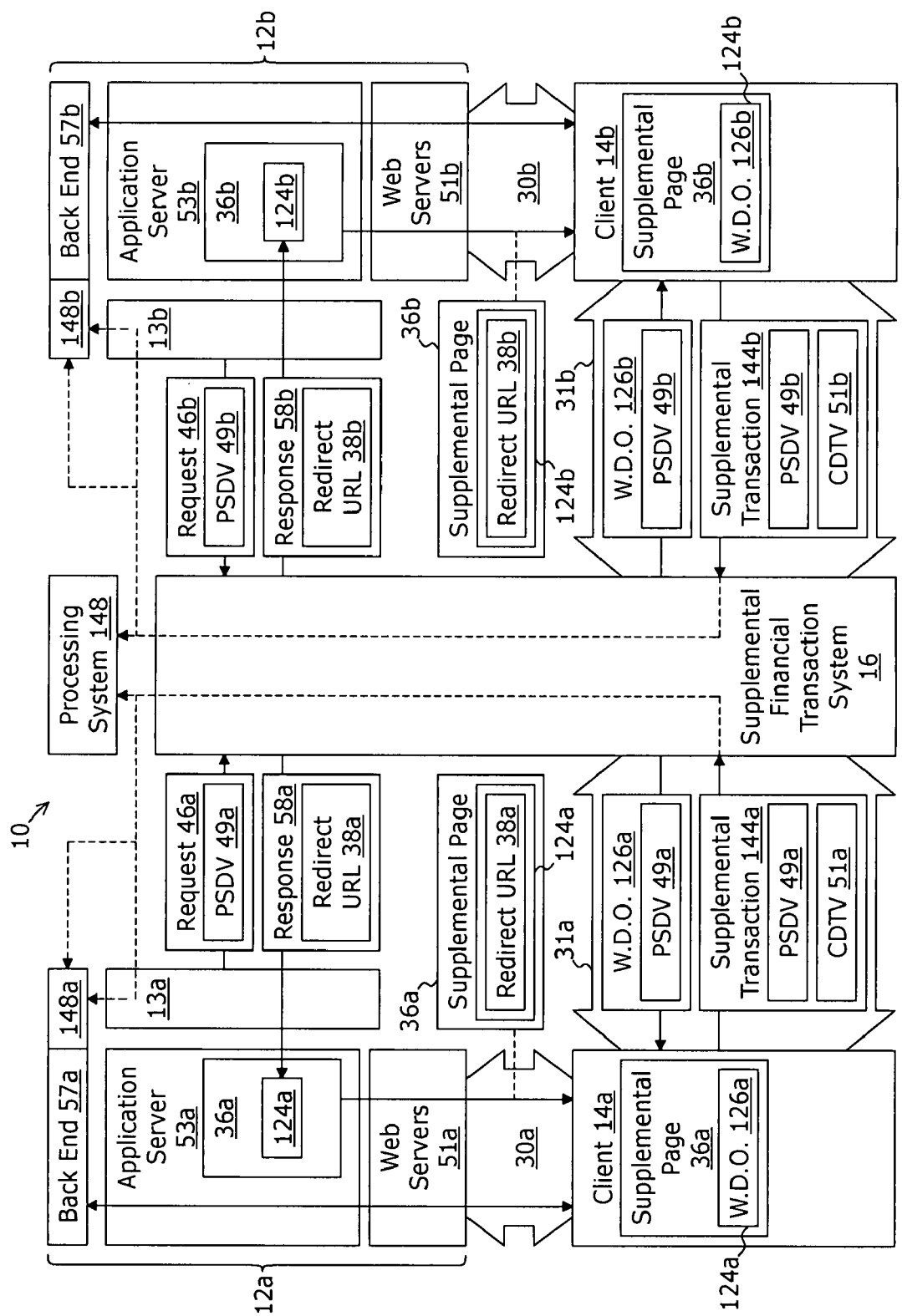
FIG. 2 is a block diagram of a system for providing supplemental transaction processing for users of primary financial services systems in accordance with one embodiment of the present invention.

FIG. 2 illustrates exemplary architecture 10 of system wherein a supplemental financial transaction processing system 16 provides financial transaction processing services to client systems 14a, 14b of one or more primary financial services systems 12a, 12b (e.g. users who are logged into one of the primary financial services systems 12a, 12b).

Each client system 14a, 14b may comprise systems with a known operating system (not shown), known IP networking hardware and software (not shown), and a known secure hypertext transport protocol (e.g. HTTPS) client such as a web browser for establishing and maintaining, through an internet connection provided by an Internet Service Provider (not shown) secure (e.g. HTTPS) connections to servers with an exposed URL.

As such, when operated by a user with applicable authentication credentials (e.g. user name and password) for a first primary financial services system 12a, the first client system 14a may establish a first secure connection 30a to web servers 51a of the first primary financial services system 12a and, in accordance with web pages provided by the first primary financial services system 12a, provide authentication credentials and navigate a menu driven sequence of web pages (e.g. a work flow) for obtaining web access to entitled banking accounts maintained by, and services offered by, the financial institution operating the first primary financial services system 12a.

Similarly, when operated by a user with applicable authentication credentials for a second primary financial services system 12b, the second client system 14b may establish a second secure connection 30b to web servers 51b of the second primary financial services system 12b and, in accordance with web pages provided by the second primary financial services system 12b, provide authentication credentials and navigate a menu driven sequence of web pages for obtaining web access to entitled banking accounts maintained by, and services offered by, the second financial institution operating the second primary financial services system 12b.

In general, each of the first and second primary financial services systems 12a, 12b may comprise traditional internet banking application architecture wherein a secure web application server 53a, 53b interfaces between web servers 51a, 51*b* (respectively) and the bank's back end account management and transaction processing systems 57*a*, 57*b* (respectively).

The web servers 51*a*, 51*b* may be staged within a DMZ with an exposed URL for enabling the client systems 14*a*, 14*b* to establish the secure connection 30*a*, 30*b* thereto. The secure web application server 53*a*, 53*b* and the bank's back end account management and transaction processing systems 57*a*, 57*b* may be staged within a secure network and communication there between may be by way of proprietary interfaces (e.g. proprietary file formats and/or data schema).

In operation, the secure web application server 53*a*, 53*b* may drive the web servers 51*a*, 51*b* (respectively) to provide, to each client system 14*a*, 14*b* through the secure connection 30*a*, 30*b* therewith, web pages which enable an authenticated user to access to his/her accounts and perform the various entitled functions supported by the secure web application server 53.

In more detail, with reference to the first primary financial services system 12*a*, data obtained from back end account management systems 57*a* may be populated into web pages provided to the client system 14*a* and transactions initiated through a client system 14*a* may be validated by the secure web application server 53*a* and input to the transaction processing systems 57*a*. Such processes performed by the application server 53*a* which enable an authenticated user to access to his/her accounts may be referred to as core functions 21*a*.

Similarly, with reference to the second primary financial services system 12*b*, data obtained from back end account management systems 57*b* may be populated into web pages provided to the client system 14*b* and transactions initiated through a client system 14*b* may be validated by the secure web application server 53*b* and input to the transaction processing systems 57*b*. Such processes performed by the application server 53*b* which enable an authenticated user to access to his/her accounts may be referred to as core functions 21*b*.

In one exemplary embodiment, each of the secure web application servers 53*a*, 53*b* may operate a traditional Automated Teller Machine (ATM) application for purposes of interfacing with the bank's back end account management and transaction processing systems 57*a*, 53*b* (respectively)—with the web servers 51*a*, 51*b* (respectively) providing a user interface to the user through the provision of web pages through the secure connection 30*a*, 30*b* (respectively) rather than providing a user interface through what is commonly referred to as an "ATM Machine".

As such, the account management and transaction processing functions (e.g. the core functions 21*a*, 21*b*) supported by each secure web application servers 53*a*, 53*b* (respectively) may consist of: i) viewing account balances, ii) viewing/printing statements; iii) transferring funds between accounts; and iv) limited payment functions such as scheduling the printing and mailing of a check drawn on an account and/or initiating Automated Clearing House (ACH) debit and credit transactions to accounts held by other financial institutions.

The system architecture 10 further comprises a supplemental financial transaction system 16 which enables each of the first and second primary financial services system 12*a*, 12*b* to make supplemental financial transactions available to its clients 14*a*, 14*b* in a seamless manner.

A supplemental financial transaction is a transaction that is not a core transaction 21 supported by the web application server 53—meaning that the web application server 53 does not include applicable systems for obtaining user input of transaction values, populating a transaction template, validating the transaction, and posting the transaction to the appropriate back end systems 57. In the exemplary embodiment, it is envisioned that the supplemental financial transactions may include real time gross settlement payments supported within various jurisdictions, such as a payment referred to as a "wire transfer" in the United States.

In general, for purposes of making a supplemental financial transaction, such as a wire transfer, available to client system 14*a* (e.g. an authenticated user which has established a secure session 30*a* with the web servers 51*a* of the primary financial services system 12*a*), the application server 53 directs a web services client 13 to initiate a request 46 for such supplemental transaction to the supplemental financial transaction system 16. As will be discussed in more detail here, the request 46 may be a web services method compliant with an applicable WSDL.

Each request 46*a*, 46*b* comprises primary system defined values 49*a*, 49*b* respectively. In general, the primary system defined values 49*a*, 49*b* represent a portion, or subset, of the values required for the supplemental transaction 140*a*, 140*b* (respectively). More specifically, the primary system defined values 49*a*, 49*b* are those values that are to be controlled by the financial institution—not the user and are required to create a validated transaction of the type for which the method call was initiated. For example, in a case wherein the supplemental financial transaction is a wire transfer, the user's account number would be a value controlled by the financial institution.

In response to receiving each transaction request, for example transaction request 46*a*, the supplemental financial transaction server 16: i) assigns a unique redirect URL 38*a* to the transaction request 46*a*; ii) stores, in association with the unique redirect URL 38*a*, the primary system defined values 49*a* provided in the request 46*a*; and iii) returns the unique redirect URL 38*a* to the primary financial services system 12*a* in a response 58*a* to the request 46*a*.

After receiving the response 58*a*, the primary financial services system 12*a* provides a supplemental transaction web page 36*a* to the client system 14*a* through the secure session 30*a*.

The supplemented transaction web page 36*a* may comprise a supplemental transaction frame 124 and, in association with the supplemental transaction frame 124, the unique redirect URL 38*a*.

As such, upon receipt of the supplemental transaction web page 36*a*, the client system 14 establishes a secure hypertext transport protocol (e.g. HTTPS) connection to the unique redirect URL 38*a*—which is an exposed URL of the supplemental financial transaction system 16.

So long as the unique redirect URL 38 remains valid (e.g. has not expired) and other authentication requirements related to the URL extensions are met, the supplemental transaction services system 16 provides a supplemental transaction web document object 126 for rendering within the supplemental transaction frame 124.

As will be discussed in more detail, the supplemental transaction web document object 126 may comprise: i) the primary system defined values 49; ii) script for rendering at least a portion of the primary system defined values 49 (in a locked or otherwise unchangeable field); iii) script for rendering of controls for obtaining user entry of at least one client defined transaction value 51 in accordance with style sheet parameters defining a look and feel matching that of web pages provided by the primary financial services system 12; and iv) transaction script.

In general, the transaction script populates both the primary system defined values 49 and the client defined transaction values into a transaction template for building the supplemental transaction, utilizes primary system defined values 49 and template defined rules for validating the supplemental financial transaction 144, and posts the validated supplemental financial transaction 144 to the supplementation financial transaction system 16 through the secure session 31.

The validated supplemental transaction 144 is then: i) stored by the supplemental financial transaction system 16; and/or ii) provided to a processing system 148 which may be distinct from the supplemental financial transaction system 16. The processing system 148 may be an independent system or may be a processing system 148a, 148b which is a component of the back end systems 57a, 57b of the primary financial services system 12a, 12b making the method call.

Figure 3:
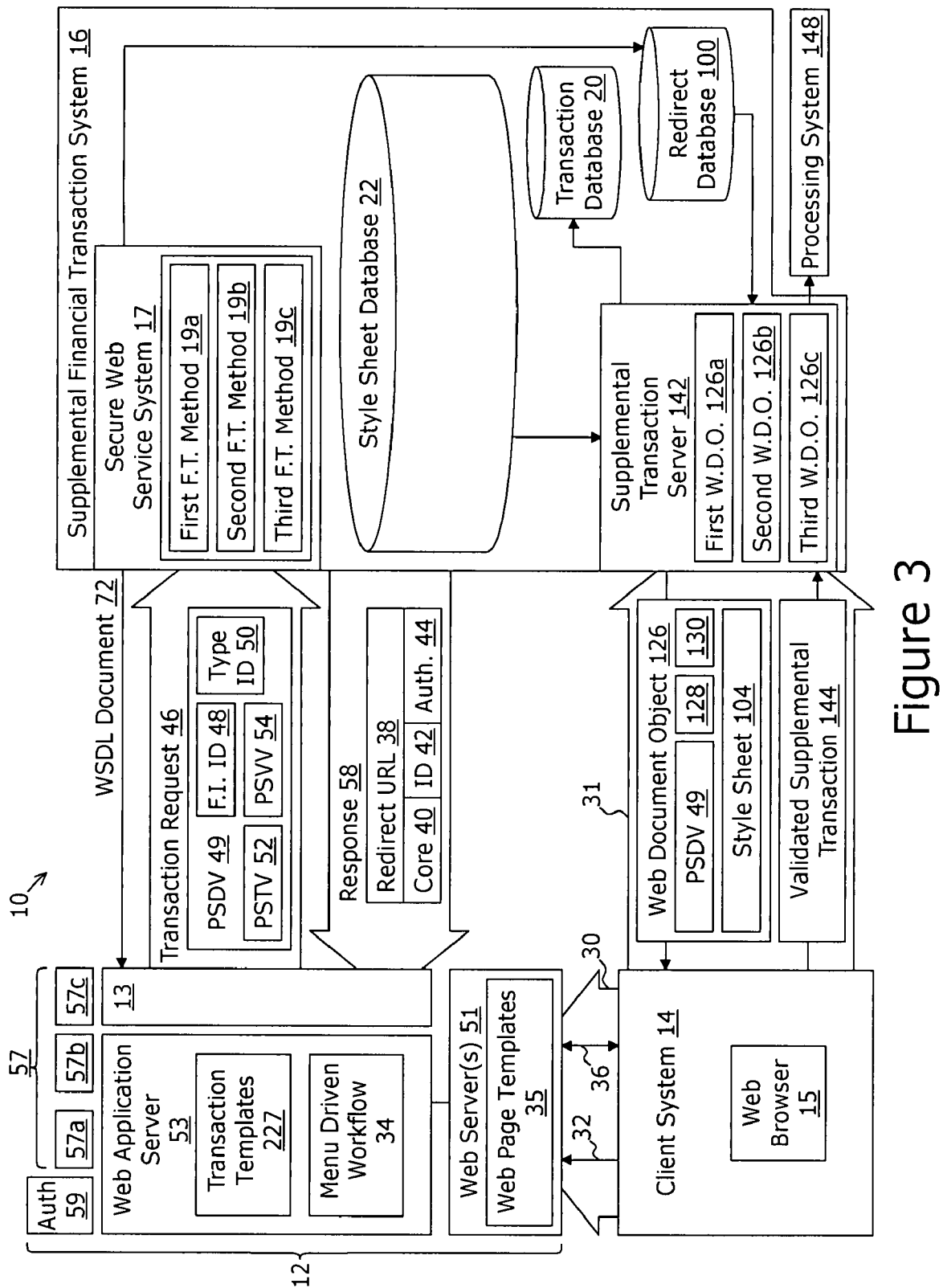
FIG. 3 is a block diagram of a system for providing supplemental transaction processing for users of primary financial services systems in accordance with one embodiment of the present invention.

The block diagram of FIG. 3 includes a more detailed representation of the client system 14, the primary financial services system 12, and the supplemental financial transaction system 16 and interactions there between.

Each client system 14 may comprise systems with a known operating system (not shown), known IP networking hardware and software (not shown), and a known secure hypertext transport protocol (e.g. HTTPS) client such as a web browser 15 for establishing and maintaining, through an internet connection provided by an Internet Service Provider (not shown) secure (e.g. HTTPS) connections to servers with an exposed URL.

As such, when operated by a user with applicable logon credentials, the client system 12 may establish the secure connection 30 to web servers 51 of the primary financial services system 12 and, in accordance with web pages provided by the primary financial services system 12, provide authentication credentials 32 and navigate a menu driven work flow 34 for obtaining web access to banking accounts maintained by, and services offered by, the financial institution operating the primary financial services system 12.

The primary financial services system 12 may comprise traditional internet banking application architecture wherein a secure web application server 53 interfaces between web servers 51 and the bank's back end account management and transaction processing systems 57.

The web servers 51 may be staged within a DMZ with an exposed URL for enabling the client systems 14 to establish the secure connection 30 thereto. The secure web application server 53 and the bank's back end account management and transaction processing systems 57 may be staged within a secure network and communication there between may be by way of proprietary interfaces (e.g. proprietary file formats and/or data schema).

In operation, the secure web application server 53 may drive the web servers 51 to provide, to each client system 14 through the secure connection 30 therewith,: i) web pages for obtaining user logon/authentication credentials 32 for authentication by one or more authentication systems 59 which control user access and entitlements to account data and transactions.

Following authentication, the secure web application server 53 may drive the web servers to provide web pages in accordance with a menu drive work flow 34 to which the authenticated user is entitled for enabling such authenticated user to access to his/her accounts and perform the various entitled functions supported by the secure web application server 53.

In more detail, data obtained from back end account management systems 57 may be populated into web page templates 35 provided to the client system 14 as part of the menu driven work flow 34 and transactions initiated through a client system 14 may be populated into a transaction template 227, validated by the secure web application server 53 and input to the transaction processing systems 57.

The diagram of FIG. 4 represents an exemplary web page 34a which may be provided as part of the menu driven work flow 34. Referring to FIG. 4 in conjunction with FIG. 3, the exemplary web page 34a may comprise a web page template 35a maintained by the web servers 51 which is: i) selected by the web application server 53 in accordance with the customer's position within the menu driven workflow 34; and ii) informational data fields populated with data elements 220a-220h obtained by the web application server 53 from one or more back end systems 57. In the present example, data elements 220a-220c related to the customer's deposit accounts an may be obtained by a back end system 57a utilized by the financial institution for maintaining customer deposit accounts. Similarly, data elements 220d-220f relate to the customer's loan accounts and may be obtained from a back end system 57b utilized by the financial institution for maintaining costumer loan accounts and data elements 220g-220h related to the customer's revolving charge accounts and may be obtained form a back end system 57c utilized by the financial institution for maintaining customer revolving charge accounts.

The web page 34a may also comprise core transaction controls 137 for selecting a core transaction supported by the web application server 34 and at least one control 138 for user selection of a supplemental financial transaction such as a wire transfer.

In the event that the user selects a core transaction control 137, in accordance with the menu driven work flow 34, the web application server 53 will drive the web servers 51 to provide a web page obtaining the user defined variables required for building and validating the selected core transaction.

For example, if the user selects a transfer funds transaction 137a, the customer system 14 may be provided with a transfer funds web page 34b (as depicted in FIG. 5) as part of the menu driven work flow 34.

The transfer funds web page 34b may comprise a web page template 35b maintained by the web servers 51 which is selected by the web application server 53 in accordance with the customer's selection of the transfer funds control 137a (FIG. 4). The template 35b may include: i) informational data fields populated with data elements 222a-222c obtained by the web application server 53 from one or more back end systems 57; and ii) controls 223 for obtaining input of user defined transaction values. The controls 223 may, for example, include a drop down menu 225 populated with the data elements 222a. Such data elements may be populated for purposes of limiting user input of user defined transaction values to values to which the user has entitlements (e.g. the user's entitled accounts).

The web page 34b, in addition to other menu choices, includes a control 224 for posting the user defined transaction values back to the web server 51—for transfer back to the web application server 53. At which time the web application server 53 may populate the applicable core transaction template 227 for building a transaction compatible with the appropriate back end system 57, validating the transaction, and transferring the transaction to the appropriate back end system 57 in accordance with the interface (e.g. file format and/or data schema) thereto—which as discussed may be proprietary.

As previously discussed, within the financial industry there exist many types of financial transactions that most banks do not support through their consumer web sites. The International Organization for Standardization developed ISO 20022 which defines a Universal Financial Industry Messaging Scheme (UNIFI). UNIFI comprises a standardize XML syntax for a vast quantity of standard financial transactions ranging from foreign payment transactions, local and state tax payment transactions, securities trade and settlement transactions, and etcetera.

It is not cost effective for a financial institution to build out its web application server 53 to support transactions wherein usage would be too low to justify the build out costs.

As such, the primary financial services system 12 may further include the web services client system 13. The web services client system 13 implements an interface to a supplemental financial transaction system 16 which supports at least one supplemental financial transaction that is not a core transaction supported by the web application server 53—thereby enabling the financial institution to make such supplemental financial transactions available to its clients through the primary financial services system 12 in a seamless manner.

For example, returning again to FIG. 4 in conjunction with FIG. 3, a financial institution may make a wire transfer transaction available to its clients 14 even though the wire transfer transaction is not a core transaction supported by the web application server 53. To enable a user to select a supplemental transaction, such as the wire transfer transaction, certain web pages within the menu driver workflow 35 may include one or more supplemental transaction control 138 as described with respect to FIG. 3.

The supplemental financial transaction system 16 may include a secure web services system 17 which accepts a method call for each of a plurality of financial transaction methods 19a-19c. Each financial transaction method 19a-19c represents, and is uniquely associated with one of the supplemental financial transaction types which are i) supported by the supplemental financial transaction system 16; and ii) made available to the primary financial services system 12 by way of a secure web services system 17 accepting a method call therefore.

To enable a primary financial services system 12 to make a method call to the secure web services system 17 for purposes of initiate making a specified supplemental transaction available to a client, a web services description language (WSDL) document 72 may be made available to the primary financial services system 12.

The WSDL document defines an XML schema required for initiating a method call for each supplemental transaction method 19a-19c in a typical manner. Of particular relevance to the present invention, and with brief reference to FIG. 9, for each supplemental financial transaction type, the WSDL 72 includes definition of a portion of the data elements for the transaction that must be provided by the primary financial service system. More specifically, the WSDL defines for each transaction type (for example the first supplemental transaction) data elements 49a which must be provided within a method call for the first financial transaction method 19a.

The required data elements 49a may comprise: i) a financial institution identifier 48 identifying the primary financial services system 12 (or the financial institution operating the primary financial services system 12); ii) first supplemental transaction required primary system transaction values 50a; and iii) first supplemental transaction required primary system validation values 52a.

Similarly, for a second supplemental transaction, the WSDL defines data elements 49b which must be provided within a method call for the second financial transaction method 19b.

The required data elements 49b may comprise: i) a financial institution identifier 48 identifying the primary financial services system 12 (or the financial institution operating the primary financial services system 12); ii) second supplemental transaction required primary system transaction values 50b; and iii) second supplemental transaction required primary system validation values 52b.

The second supplemental transaction required primary system transaction values 50b and the second supplemental transaction required primary system validation values 52b may be unique from the first supplemental transaction required primary system transaction values 50a and the first supplemental transaction required primary system validation values 52a.

Returning to FIG. 3, for purposes of initiating a supplemental transaction, the supplemental financial transaction system 16 may receive, at the secure web services system 17, a transaction request 46 from the primary financial services system 12. As discussed, the transaction request 46 may be a web services method call with an XML data structure complying with WSDL 72 and embodied as a Simple Object Access Protocol (SOAP) message.

As such, returning again to FIG. 4 in conjunction with FIG. 3, if the user activates the supplemental transaction control 138 (which is a control associated with a supplemental transaction supported by the supplement transaction services system 16), the web application server 53 drives the web services client 13 to generate the transaction request to the secure web services system 17.

Figure 9:
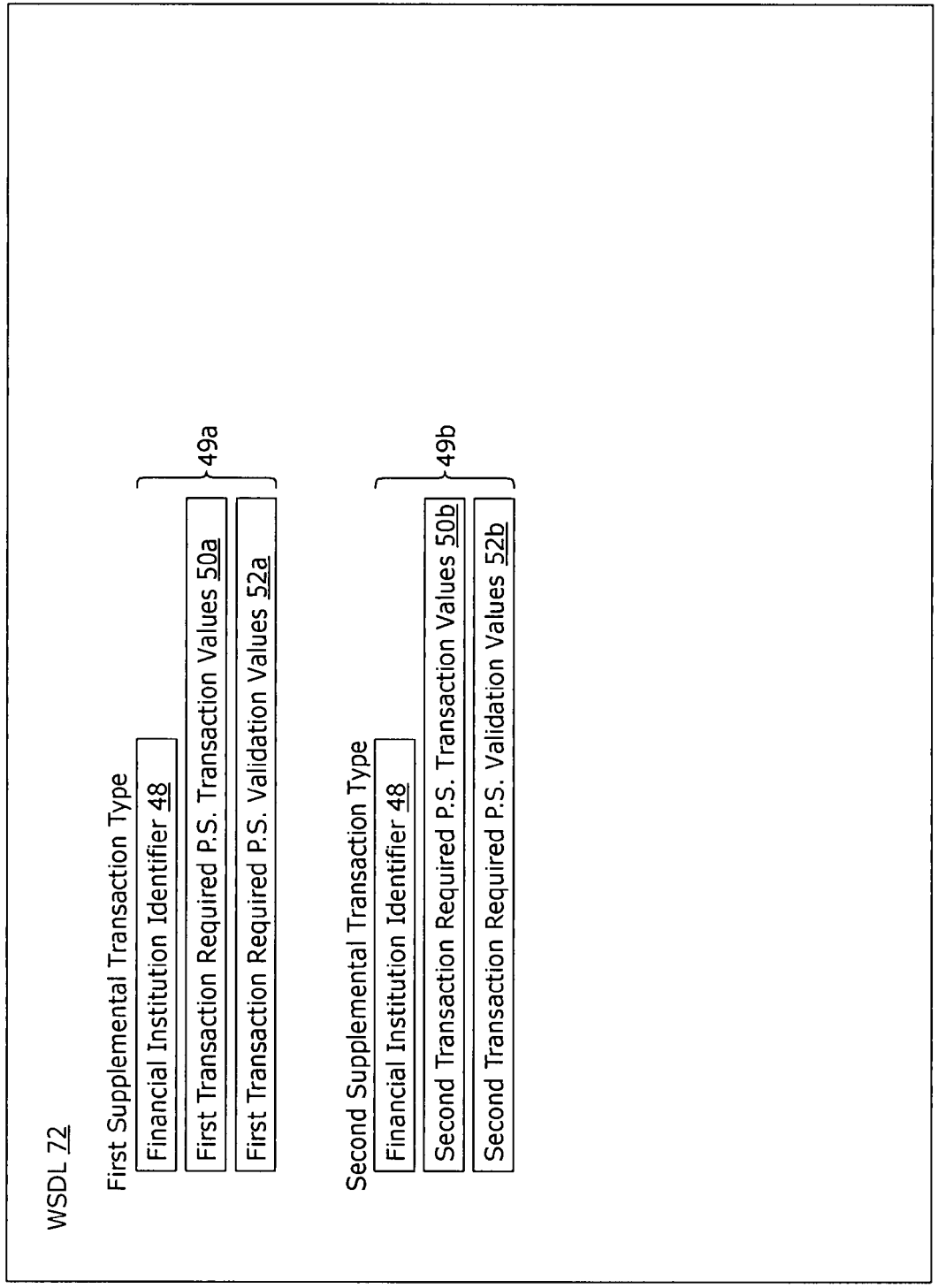
FIG. 9 is a block diagram representing exemplary information included in a web services description language document useful for practice of an embodiment of the present invention.

In accordance with the exemplary requirements of the WSDL 72 as discussed with respect to FIG. 9, the transaction request 46 may comprise at least the following data elements: i) a primary system identifier 48 identifying the primary system making the transaction request 46; ii) at least one primary system defined transaction value 50 which is a value for a required data field in the supplementation financial transaction being requested; and iv) at least one primary system defined validation value 54 which is a value used for validating the supplementation financial transaction being requested.

An example of a primary system defined transaction value 52 may be the end user's bank account number. The bank account number is required for execution of a wire transaction. An example of a primary system defined validation value 54 may be the available balance of the bank account. The available balance is required for execution of a validation rule for assuring that the wire transfer amount does not exceed available balance.

The transaction request 46 may be built by populating the required data elements by one of the web application server 53 or the web server client 13 (which obtains the values for population from the web application server 53) into a template defined by the WSDL 72 for the transaction being requested.

In response to receiving the transaction request 46, the supplemental financial transaction server 16 assigns a unique redirect URL 38 to the transaction request and stores, in a redirect database 100, in association with the unique redirect URL 38, the data elements provided in the method call.

Turning briefly to FIG. 12, an exemplary redirect database 100 may comprise a plurality of records, each of which is associated with a transaction request 46 initiated by a primary financial services system 12.

Each record associates the unique redirect URL 38 with: i) a time stamp value 74; ii) the financial institution ID 48, iii) the transaction type ID 50, and iv) the primary system defined values 49 including the primary system defined transaction values 52 and the primary system defined validation values 54.

The unique redirect URL 38 may comprise a core URL 40 comprising the domain name of the supplemental financial transaction system 16 as well as one or more extensions uniquely associated with the requested supplemental transaction. In an exemplary embodiment, the extensions may comprise an identification value 42 uniquely associated with the requested transaction and an authentication value 44.

The time stamp value 74 indicates one of: i) the time of creation of the unique redirect URL 38; and ii) a time of expiration of the unique redirect URL 38 may also be stored in association with the unique redirect URL. The unique redirect URL 38 is returned to the primary financial services system 12 as part of a response 58 (which may be a SOAP message returned in response to the web services call 46).

Returning to FIG. 3, the secure web services system 17 provides a response 58 back to the primary financial services system 12 making the transaction request 46. As discussed, the response comprises the unique redirect URL 38.

Figure 6:
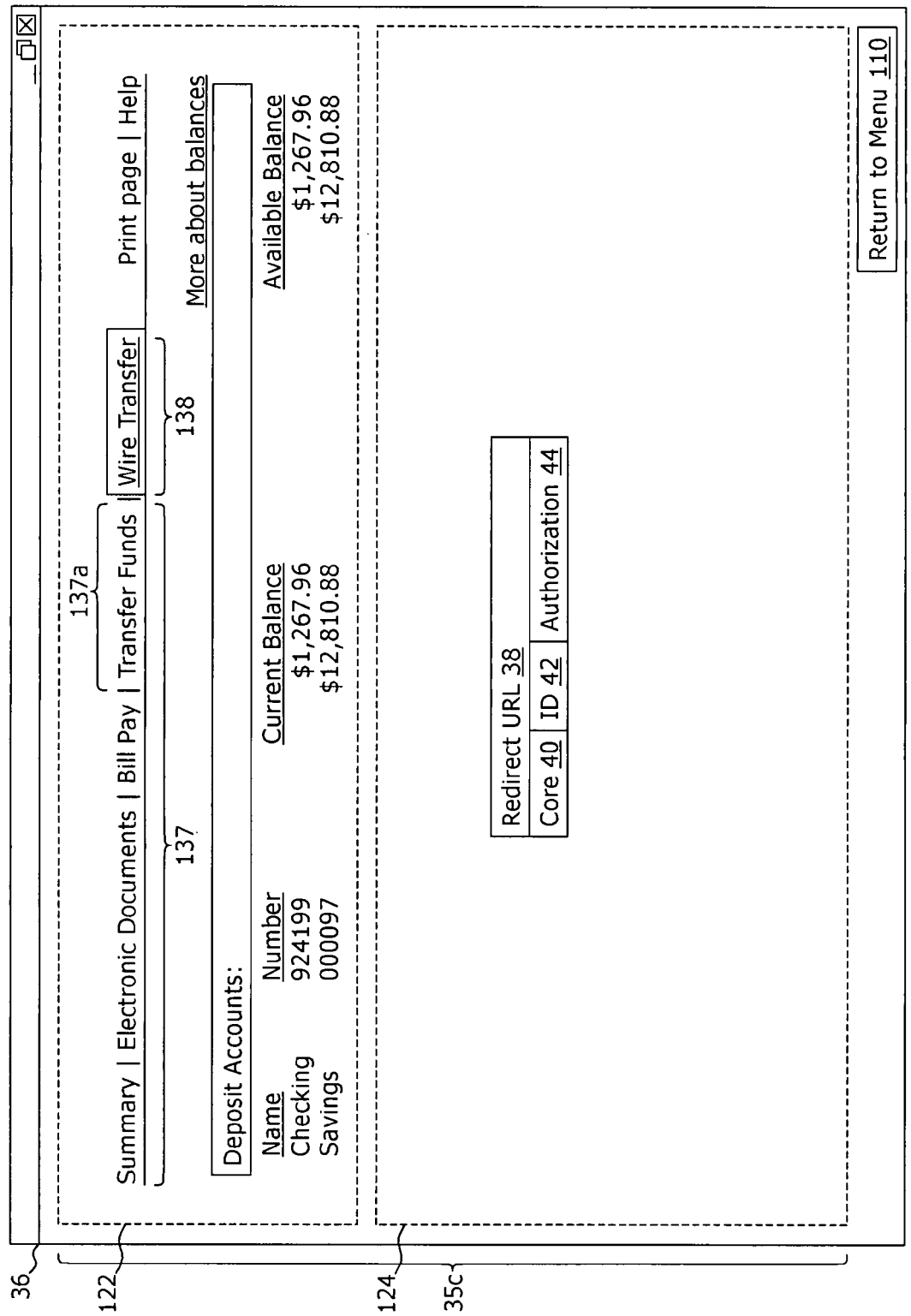
FIG. 6 is a diagram of a supplemental transaction web page provided as part of a menu driven sequence of web pages in accordance with one embodiment of the present invention.

Turning to FIG. 6 in conjunction with FIG. 3, after receiving the response 58, the primary financial services system 12 provides a supplemental transaction web page 36 to the client system through the secure session 30. The supplemented transaction web page 36 may comprise a primary system frame 122 and a supplemental transaction frame 124.

The primary system frame 122 may comprise: i) controls for selecting additional menu choices for services provided by the primary financial services system 12; and ii) data values related to the user's accounts with the financial institution such as account numbers and balances—all having a look and feel matching that of other web pages within the menu driven sequence of web pages provided by the primary financial services system 12 (e.g. style sheet parameters defining back ground colors, text colors, text fonts, control styles, logos, and/or other look and feel parameters).

The supplemental transaction frame 124 comprises an association with the redirect URL 38 such that the client system 14 may establish as secure connection 31 to the supplemental transaction server 16 utilizing the core portion of the unique redirect URL 38.

As such, upon obtaining the supplemental transaction web page 36 from the primary financial services system 12, the client system 15 establishes a secure connection 31 to the unique redirect URL 38. So long as the unique redirect URL 38 has not expired, and any authentication requirements related to the URL extensions are met, the supplemental transaction services system 16 provides a supplemental transaction web document object 126 for population into the supplemental transaction frame 124 as depicted in FIG. 6.

The supplemental transaction web document object 126 may comprise rendering control script 128 and transaction control script 130. The rendering control script defines and implements display of at least one primary system defined transaction value 52 (in a locked or otherwise unchangeable field) and controls for obtaining user entry of at least one client defined transaction value 51. All rendering of the web document object 126 is in accordance with style sheet parameters 104 which define a look and feel which matches that of the web pages generally provide by the primary financials services system which initiated the supplemental transaction (e.g. the same background colors, the same font colors, the same font styles, the same control styles and looks, the same branding and etc).

Figure 7:
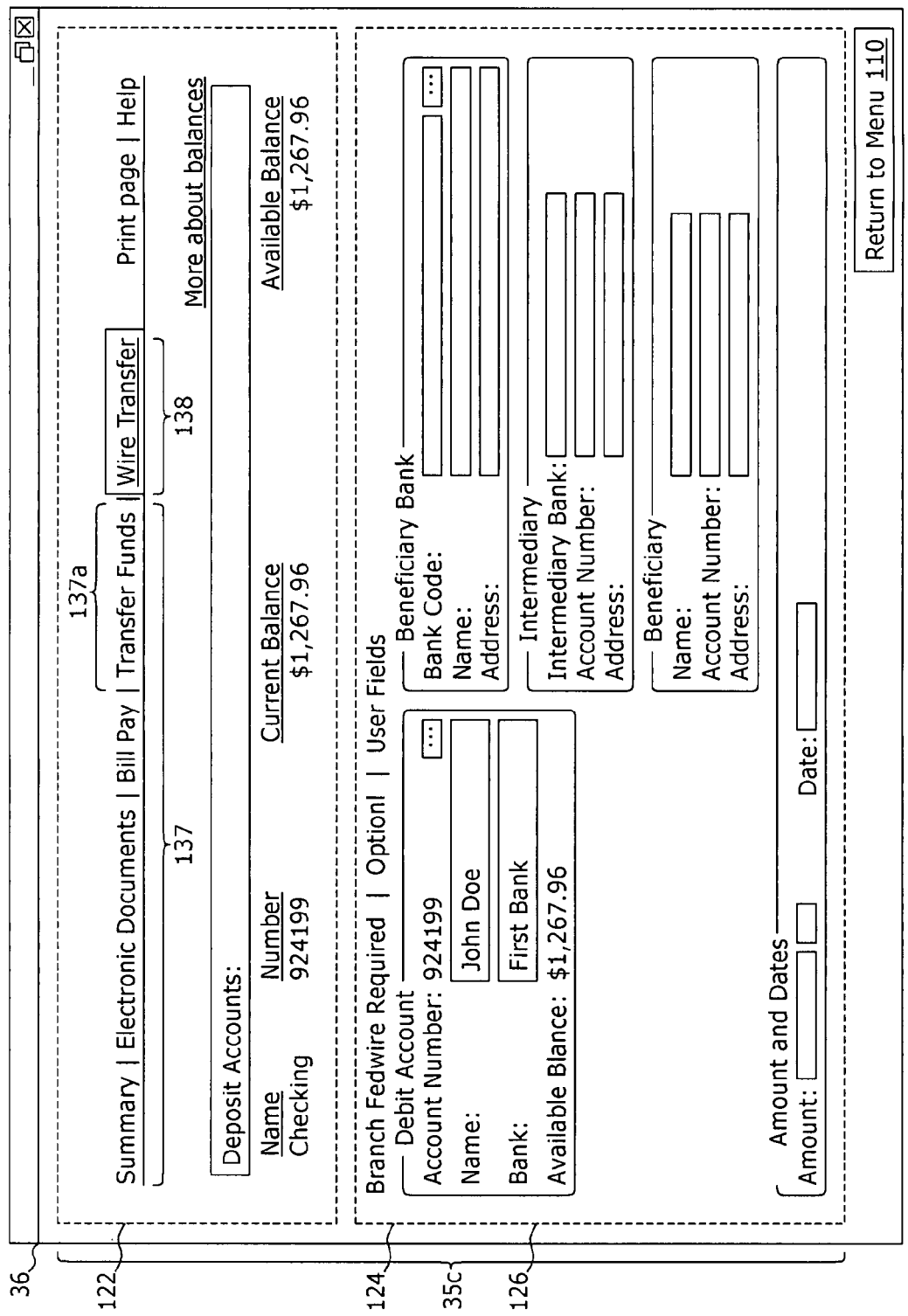
FIG. 7 is a diagram of a supplemental transaction web page provided as part of a menu driven sequence of web pages in accordance with one embodiment of the present invention.
Figure 8:
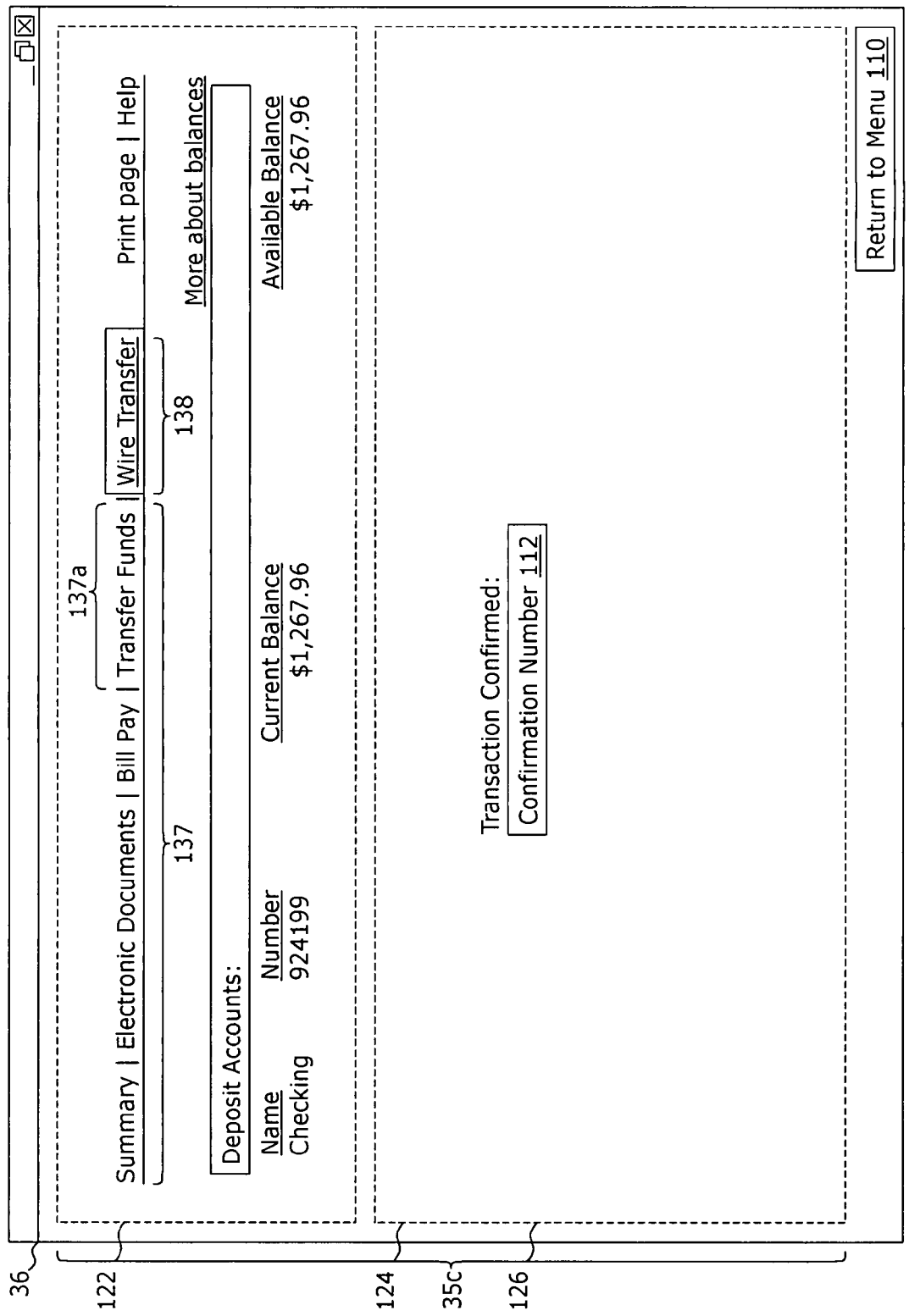
FIG. 8 is a diagram of a supplemental transaction web page provided as part of a menu driven sequence of web pages in accordance with one embodiment of the present invention.

Turning briefly to FIG. 13, an exemplary style sheet database 22 is represented. The style sheet database 22 associates, with each financial institution ID 48, various style sheet parameters which enable the web document object 126 (FIG. 3 and FIG. 7) to have the same look and feel as the web pages provided by the primary financial services system 12 as part of its menu driven workflow 34. Exemplary style sheet parameters include a background color parameter 104*a*, a font color parameter 104*b*, a font style 104*c*, and other parameters useful for enabling the web document object 126 (FIG. 3 and FIG. 7) to have the same look and feel as the web pages provided by the primary financial services system 12 as part of its menu driven workflow 34. When providing a web document object 126 to a client system 14, the supplemental transaction server selects the style parameters 104 matching the primary system initiating the supplemental transaction.

The transaction control script 130 may comprise validation instructions for validation of the supplemental financial transaction following user entry of the at least one client defined value 51 and instructions for posting of the validated supplemental financial transaction 144 to the supplemental financial transaction system 16 through the secure session 31 established thereto.

It should be appreciated that the elements of the transaction web document object 126 are described herein as distinct script components and instructions. Such description is to facilitate description of the present invention. Those skilled in the art will recognize that the script components and instructions may be consolidated within permutations of one or more executable (or interpretable) objects including but not limited to Active X objects and Java objects executable by a Java virtual machine operating in conjunction with the client system browser.

Upon completion of user input of at least one client defined transaction value 51 such as the beneficiary bank code, account number, and account holder name, beneficiary bank, the validation script 130*a* performs validation of the client defined transaction values. Validation may comprise calculating the result of a function of a combination of: i) the client defined transaction values, ii) the primary system defined transaction values, the iii) primary system defined validation values, and/or iv) transaction specified validation values defined within the web document object 126—and comparison of such result to a second function of: i) the client defined transaction values, ii) the primary system defined transaction values, the iii) primary system defined validation values, and/or iv) transaction specified validation values defined within the web document object 126.

The result of the function or the result of the second function may simply be one of the primary system defined values or the primary system defined transaction values. For example, the validation may comprise comparing a client defined transaction value, such as payment amounts to a primary system defined validation value such as available account balance—wherein the transaction is invalid unless the payment amount is less than the available balance.

As another example, validation may comprise comparing a user specified transaction date to calendar date values specified in the web document object 126. The transaction is invalid unless the user specified transaction date is a date on which the supplemental transaction may be executed (e.g. a banking business day).

As yet another example, validation may comprise comparing a user defined bank code for a beneficiary bank. The transaction is invalid unless the user defined bank code complies with bank code format requirements such as total length of digits, check values, or other format requirements that may be applicable to the bank code of the beneficiary bank—as defined by validation values within the web document object 126.

Following validation, the validation transaction 144 is posted back to the supplement financial transaction system 16 for execution. As discussed, the validated supplemental transaction 144 is then: i) stored by the supplemental financial transaction system 16; and/or ii) provided to a processing system 148 which may be distinct from the supplemental financial transaction system 16. The processing system 148 may be an independent system or may be a processing system 148a, 148b which is a component of the back end systems 57a, 57b of the primary financial services system 12a, 12b making the method call.

Figure 10:
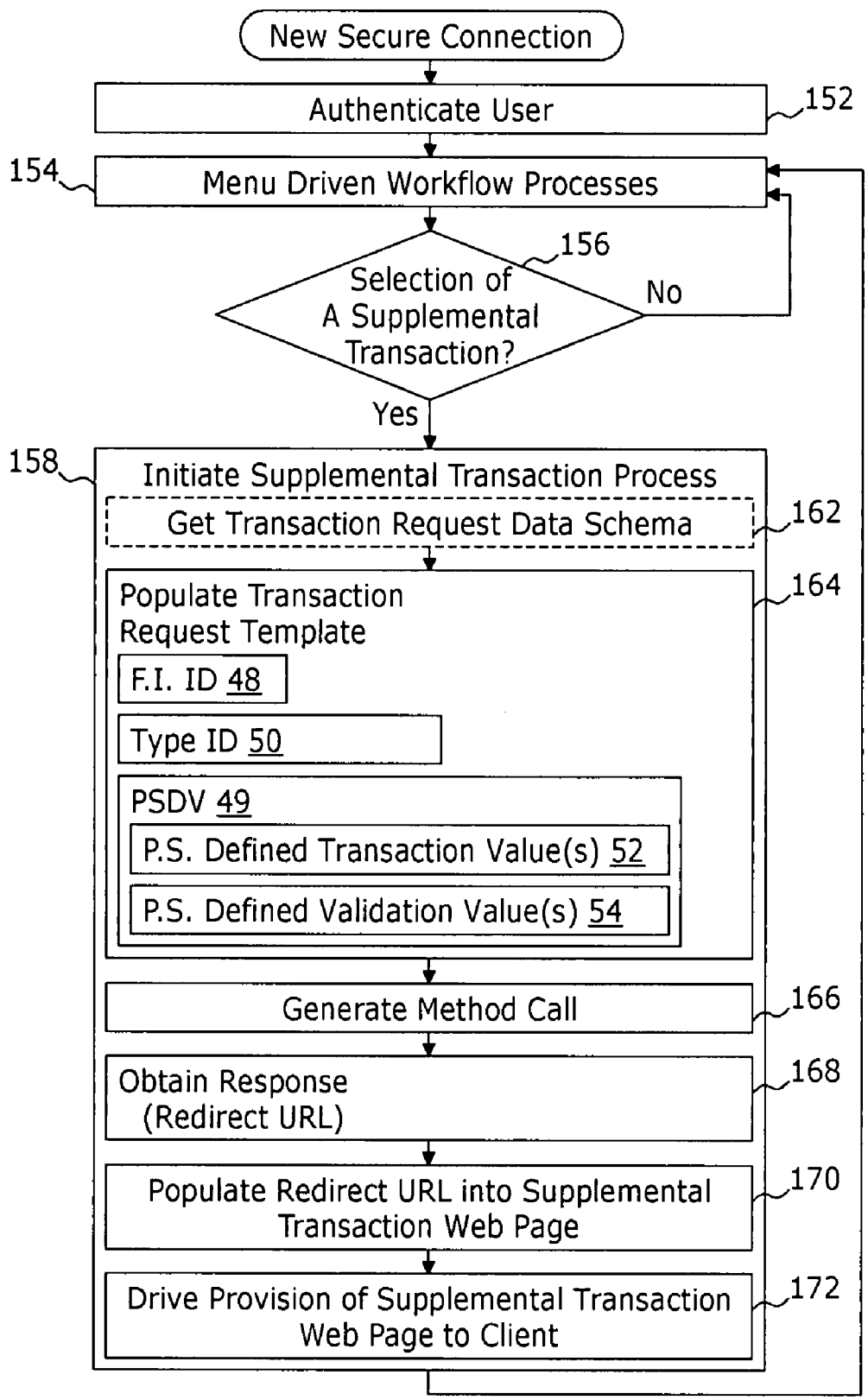
FIG. 10 is a flow chart representing exemplary operation of an aspect of the present invention.

The flow chart of FIG. 10 represents exemplary stages that may be performed by the primary financial services system 12 for purposes of implementing an aspect of the present invention. Following a client system 15 establishing a secure connection to the primary financial services system, the user is authenticated at stage 152 and the menu driven workflow processes enabling the user to access his/her accounts is commenced at step 154.

Decision box 156 represents determining whether the user has selected a supplemental transaction. So long as the user navigates the menu driven workflow without selection of a supplemental transaction, the menu driven workflow process is continued as represented by the loop back from decision box 156 to stage 154.

Upon user selection of a supplemental transaction at 156, the supplemental transaction process is initiated at stage 158.

Stage 158 may comprise multiple sub steps for enabling the user to execute the supplemental transaction. For example, sub step 162 represents obtaining the appropriate data schema for the transaction request which, as discussed, may comprise obtaining the WSDL 72. Step 162 is shown in a dashed box representing that it need not be independently performed for each transaction.

Step 164 may comprise populating the appropriate transaction request template with the data elements needed for generating a valid transaction request 46 to the secure web services system 17. As discussed, the transaction request 46 may require at least a financial institution identifier 48, a transaction type ID 50 primary system defined values 49.

Step 166 represents transmitting the transaction request 46 to the secure web services system 17—as a SOAP message.

Step 168 represents receiving the unique redirect URL 38 in response to the transaction request 46.

Step 170 represents populating the unique redirect URL into the applicable supplemental transaction web page 36 (represented in FIG. 6) and step 170 represents provision of supplemental transaction web page 36 to the client system though the secure connection established by the client system to the primary financial services system 12.

Figure 11:
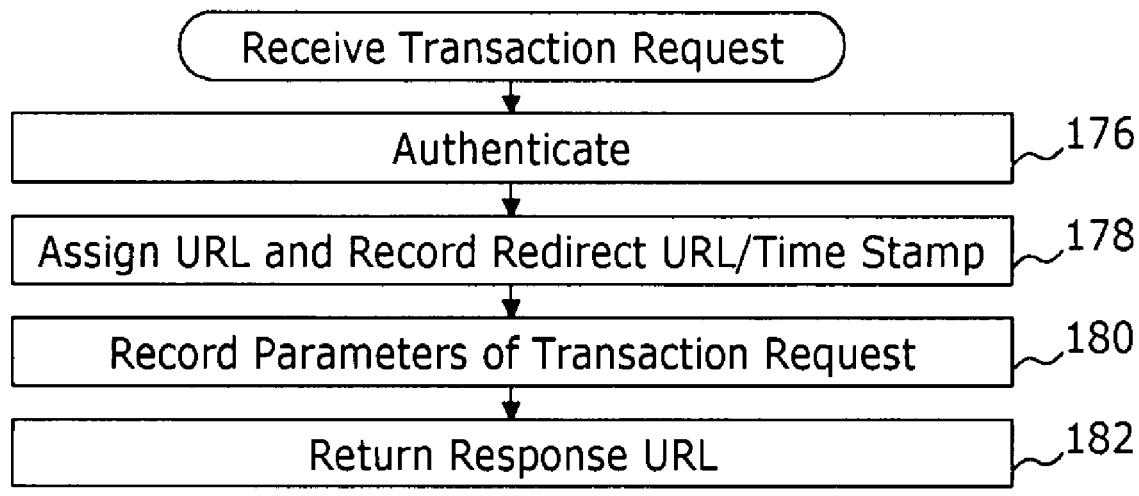
FIG. 11 is a flow chart representing exemplary operation of an aspect of the present invention.

The flow chart of FIG. 11 represents exemplary steps that may be performed by the secure web services system 17 in response to receiving a transaction request and for purposes of implementing an aspect of the present invention.

Step 176 represents authenticating the primary financial services system 12 initiating the request.

Step 178 represents assigning the unique redirect URL 38, as well as determining the time stamp value 74 and step 180 represents recording the unique redirect URL 38 (or at least the ID 42 and authentication 44 portions) in the redirect database 100 and, in associate therewith, the parameters provided in the transaction request 46—as discussed with respect to FIG. 3 and FIG. 12.

Step 182 represents providing the response 58 back to the primary financial services system 12 as discussed with respect to FIG. 3.

Figure 14:
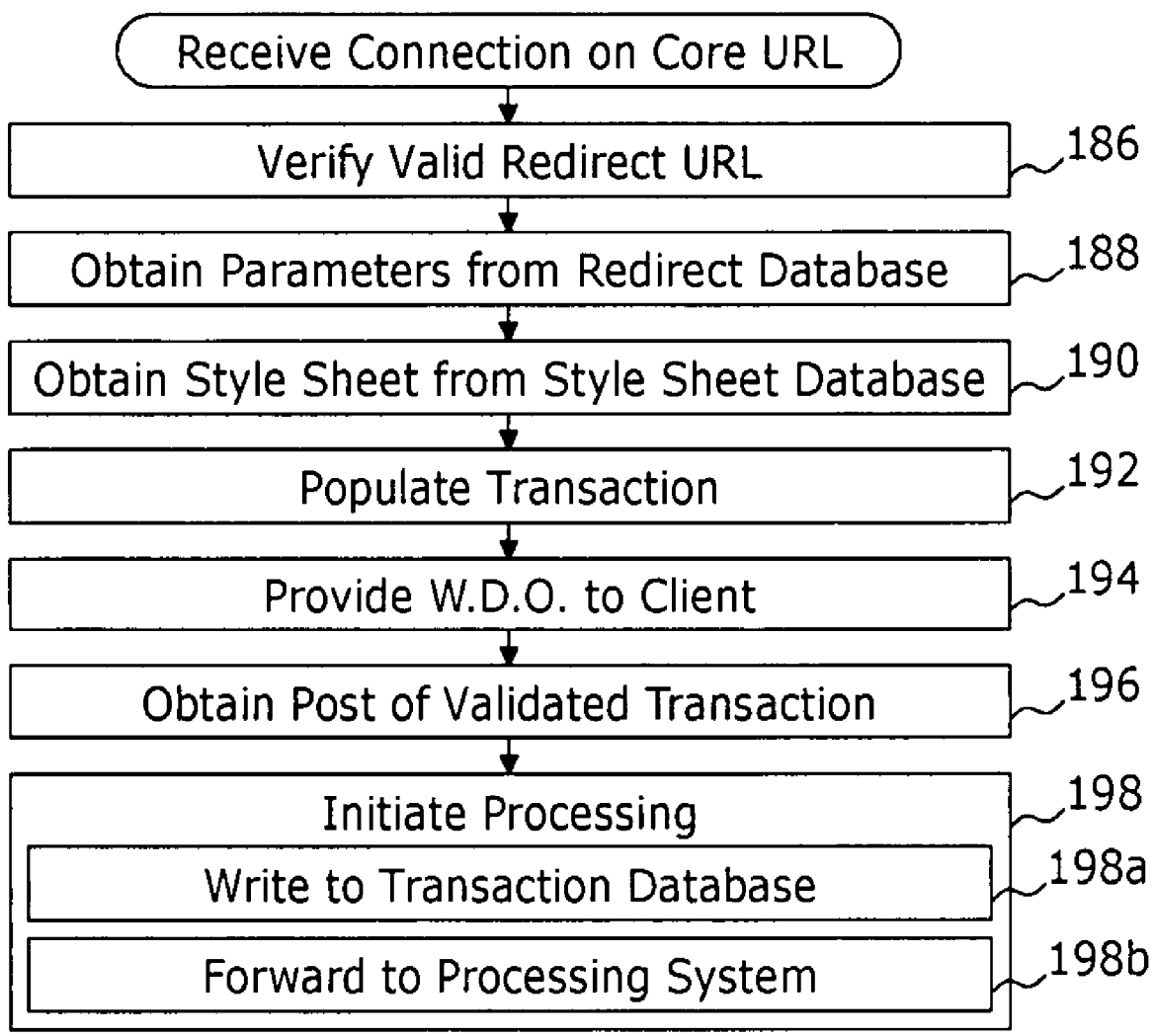
FIG. 14 is a flow chart representing exemplary operation of an aspect of the present invention.

The flow chart of FIG. 14 represents exemplary steps that may be performed by the supplemental transaction server 142 in response to receipt of a connection request on the core URL 40 associated with the supplemental transaction server 142 and for purposes of implementing an aspect of the present invention.

Step 186 represents verifying the validity of the URL extensions (identifier 42 and authentication components 44) provided by the client initiating are valid. Such step may also comprise verifying that the connection is received prior to expiration of the unique redirect URL 38.

Step 188 represents obtaining the parameters associated with the unique redirect URL 38 in the redirect database and step 190 represents obtaining the style sheet parameters 104 associated with the primary financial services system 12 making the transaction request.

Step 192 represents populating the applicable web document object template and step 194 represents providing the web document object 26 to the client system through the secure connection 31 for rendering within the supplemental frame 124 of the supplemental web page 36 as discussed with respect to FIG. 2 and FIG. 3.

Step 196 represents receiving a post of the validated transaction 144 back from the client system 14 and step 198 represents initiating processing of the transaction. As discussed with respect to FIG. 2, such processing may comprise writing the transaction to a transaction database 20 and/or providing the transaction to a processing system 148 distinct form the supplemental financial transaction system 16.

Although the invention has been shown and described with respect to certain preferred embodiments, it is obvious that equivalents and modifications will occur to others skilled in the art upon the reading and understanding of the specification.

It is envisioned that after reading and understanding the present invention those skilled in the art may envision other processing states, events, and processing steps to further the objectives of the modular multi-media communication management system of the present invention. The present invention includes all such equivalents and modifications, and is limited only by the scope of the following claims.

What is claimed is:

1. A supplemental financial transaction processing system for operating in conjunction with at least one primary financial services system and providing financial transaction processing services to a client system which has established a secure session with the primary financial services system, the supplemental financial transaction processing system comprising:

a web services description language (WSDL) document made available to the primary financial services system, the WSDL document defining an XML schema required for a method call of a transaction request and including definition of primary system defined transaction values which must be provided by the primary financial services system in the transaction request;

a transaction request received from the primary financial services system, the transaction request including a web services method call with an XML data structure comprising required data elements, the required data elements comprising:

a financial institution identifier, the financial institution identifier identifying the primary financial services system which initiated the transaction request; and at least one primary system defined transaction value;
at least one primary system defined validation value;
a secure web services system, the secure web services system, receiving the transaction request and in response to receiving the transaction request:
assigns a unique redirect URL to the transaction request, the unique redirect URL being an exposed URL of the supplemental financial transaction system;
stores, in a redirect database, in association with the unique redirect URL, the primary system defined transaction value; and
returns the unique redirect URL to the primary financial services system; and
a web document object comprising:
the at least one primary system defined transaction value;
the at least one primary system defined validation value;
user interface control script, the user interface control script comprising instructions which render, on the client system, controls for obtaining user entry of at least one client defined transaction value; and
validation control script, the validation control script determining that the transaction is valid by executing at least one validation rule comprising comparing the result of a mathematic function of the client defined transaction value to the primary system defined validation value; and
transaction control script, the transaction control script comprising instructions which:
a) create a financial transaction from the at least one primary system defined transaction value and the at least one client defined transaction value; and
b) post the financial transaction back to the supplemental transaction server only if the transaction is valid;
a supplemental transaction server, the supplemental transaction server:
providing the web document object to the client system in response to receiving a secure connection by the client system at the unique redirect URL;
receiving a post of the financial transaction from the client system, the financial transaction containing information identifying the at least one financial institution defined transaction value and the at least one client defined transaction value; and
performing at least one of: i) writing the financial transaction to a transaction database; or ii) forwarding the financial transaction to a processing system distinct from the supplemental transaction processing system.

2. The supplemental financial transaction system of claim 1, in which:
the web document object further comprises the financial institution identifier; and
the financial transaction further comprises the financial institution identifier.

3. The supplemental financial transaction system of claim 1, in which:
the secure web services system further defines a time period for which the unique redirect URL is valid; and
the supplemental transaction server provides the web document object only in response to receiving a secure connection at the unique redirect URL during the time period defined by the secure web services system.

4. The supplemental financial transaction system of claim 1:
further comprising a style sheet database, the style sheet database comprising a plurality of style sheets, each style sheet being associated with one of a plurality of financial institution identifiers and each style sheet defining at least one of: a font style, font color, or background color; and
in which the supplemental transaction server further:
obtains a style sheet from the style sheet database, the style sheet being the one of the plurality of style sheets that is associated with the financial institution identifier identifying the primary financial services system which initiated the transaction request; and
provides the obtained style sheet in conjunction with the web document object; and
in which the user interface control script further renders the controls for obtaining user entry of at least one client defined transaction value in accordance with the style sheet provided by the supplemental transaction server.

5. The supplemental financial transaction processing system of claim 1, further comprising:
a supplemental transaction web page provided to the client system by the primary system, the supplement transaction web page comprising:
a primary system frame, the primary system frame controls driving selection of additional menu choices defining services provided by the primary financial services system; and
a supplemental transaction frame, the supplement transaction frame comprising an association with the unique redirect URL driving the client system to establish a secure connection to the unique redirect URL and obtain the supplemental transaction web document object from the supplemental transaction server.

6. A supplemental financial transaction processing system for providing financial transaction processing services to a first client system which has established a secure session with a first primary financial services system and to a second client system which has established a secure session with a second primary financial services system distinct from the first primary financial services system, the supplemental financial transaction processing system comprising:
a web services description language (WSDL) document made available to the primary financial services system, the WSDL document defining an XML schema required for a method call of a transaction request and including definition of primary system defined transaction values which must be provided by the primary financial services system in the transaction request;
a first transaction request received from the first primary financial services system, the first transaction request including a web services method call with an XML data structure comprising required data elements, the required data elements comprising:
a financial institution identifier, the financial institution identifier identifying the first primary financial services system which initiated the first transaction request; and
at least one first primary system defined transaction value;
at least a first primary system defined validation value;
a second transaction request received from the second primary financial services system, the second transaction request including a web services method call with an XML data structure comprising required data elements, the required data elements comprising:

a financial institution identifier, the financial institution identifier identifying the second primary financial services system which initiated the second transaction request; and at least one second primary system defined transaction value;

at least a second primary system defined validation value;

a secure web services system, the secure web services system receiving the first transaction request and receiving the second transaction request:

in response to receiving the first transaction request:
generates, a first unique URL, the first unique URL being an exposed URL of the supplemental financial transaction system;
stores, in a redirect database, in association with the first unique URL, the first primary system defined transaction value;
returns the first unique URL to the first of the primary financial services systems;

in response to receiving the second transaction request:
generates, in response to the second method call, a second unique URL, the second unique URL being an exposed URL of the supplemental financial transaction system distinct from the first unique URL;
stores, in the redirect database, in association with the second unique URL, the second primary system defined transaction value; and
returns the second unique URL to the second of the primary financial services systems;

a first web document object comprising:
the at least one first primary system defined transaction value;
user interface control script, the user interface control script comprising instructions which render, on the first client system, controls for obtaining user entry of at least one client defined transaction value; and
the transaction control script comprising instructions which:
a) create a first financial transaction from the at least one first primary system defined transaction value and the at least one client defined transaction value; and
b) post the first financial transaction back to the supplemental transaction server only if the first financial transaction is valid; and
validation control script, the validation control script determining that the first financial transaction is valid if a comparison of the result of a mathematic function of the client defined transaction value to the first primary system defined transaction value is a predetermined result; and a second web document object comprising:
the at least one second primary system defined transaction value;
user interface control script, the user interface control script comprising instructions which render, on the second client system, controls for obtaining user entry of at least one client defined transaction value; and
transaction control script, the transaction control script comprising instructions which:
a) create a second financial transaction from the at least one second primary system defined transaction value and the at least one client defined transaction value; and
b) post the second financial transaction back to the supplemental transaction server only if the second financial transaction is valid;
validation control script, the validation control script determining that the second financial transaction is valid if a comparison of the result of a mathematic function of the client defined transaction value to the second primary system defined transaction value is a predetermined result; and a supplemental transaction server, the supplemental transaction server:
receive a first secure connection at the first unique redirect URL from the first client system and providing the first web document object in response thereto;
receive a second secure connection at the second unique redirect URL from the second client system and providing the second web document object in response thereto;
upon receipt of a first transaction posted back to the supplemental transaction server in response to provision of the first web document object, the supplemental transaction server is further configured to provide the first financial transaction to processing systems which are both distinct from the supplemental transaction processing system and associated with the first of the primary financial services system; and
upon receipt of a second transaction posted back to the supplemental transaction server in response to provision of the second web document object, the supplemental transaction server is further configured to provide the second financial transaction to processing systems which are both distinct from the supplemental transaction processing system and associated with the second of the primary financial services system.

7. The supplemental financial transaction system of claim 6, in which:
the first web document object further comprises the financial institution identifier identifying the first primary financial services system;
the first financial transaction further comprises the financial institution identifier identifying the first primary financial services system;
the second web document object further comprises the financial institution identifier identifying the second primary financial services system;
the second financial transaction further comprises the financial institution identifier identifying the second primary financial services system.

8. The supplemental financial transaction system of claim 6, in which:
the secure web services system defines:
a first time period during which the first unique redirect URL is valid; and
a second time period during which the second unique redirect URL is valid; and
the supplemental transaction server further:
only provides the first web document object in response to receiving a secure connection at the first unique redirect URL if the connection is received before expiration of the first time period; and
only provides the second web document object in response to receiving a secure connection at the second unique redirect URL if the connection is received before expiration of the second time period.

9. The supplemental financial transaction system of claim 6:
   further comprising a style sheet database, the style sheet comprising:
      a first style sheet stored in association with identification of the first primary financial services systems; and
      a second style sheet stored in association with identification of the second primary financial services systems;
   the first style sheet associating at least one of a font style, font color, and background color with a first financial institution operating the first primary financial services systems;
   the second style sheet associating at least one of a font style, font color, and background color with a second financial institution operating the second primary financial services systems;
   the supplemental transaction server further:
      i) obtains a selected style sheet from the style sheet database the selected style sheet is the style sheet that is associated with the financial institution identifier of the transaction request; and
      ii) provides the provide such selected style sheet in conjunction with the web document object, the first style sheet being selected and provided in conjunction with the first web document object and the second style sheet being selected and provided in conjunction with the second web document object; and
   the user interface control script is further adapted to render the controls for obtaining user entry of at least one client defined transaction value in accordance with the style sheet provided by the supplemental transaction server.

10. A supplemental financial transaction processing system for operating in conjunction with at least one primary financial services system and providing financial transaction processing services to a client system which has established a secures session with the primary financial services system, the supplemental financial transaction processing system comprising:
   a web services description language (WSDL) document made available to the primary financial services system, the WSDL document defining an XML schema required for a web services method call of a transaction request and including required data elements which must be provided by the primary financial services system in a transaction request;
   a transaction request received from the primary financial services system, the transaction request including a web services method call with an XML data structure comprising the required data elements, the required data elements comprising:
      a financial institution identifier, the financial institution identifier identifying the primary financial services system which initiated the transaction request; and
      an available account balance;
   a secure web services system, the secure web services system, receiving the transaction request and in response to receiving the transaction request:
      assigns a unique redirect URL to the transaction request, the unique redirect URL being an exposed URL of the supplemental financial transaction system;
      stores, in a redirect database, in association with the unique redirect URL, the financial institution identifier and the available account balance; and
      returns the unique redirect URL to the primary financial services system; and
   a web document object comprising:
      the available account balance;
      user interface control script, the user interface control script comprising instructions which render, on the client system, controls for obtaining user entry of a payment amount; and
      validation control script, the validation control script validating the transaction by comparing the result of a mathematic function of the payment amount to the available account balance with the transaction being valid only if the payment amount is less than the available account balance; and
      transaction control script, the transaction control script comprising instructions which post the transaction back to the supplemental transaction server only if the transaction is valid,
   a supplemental transaction server, the supplemental transaction server:
      providing the web document object to the client system in response to receiving a secure connection by the client system at the unique redirect URL;
      receiving a post of the financial transaction from the client system, the financial transaction containing information identifying the at least one financial institution defined transaction value and the at least one client defined transaction value; and
      performing at least one of: i) writing the financial transaction to a transaction database; or ii) forwarding the financial transaction to a processing system distinct from the supplemental transaction processing system.

11. The supplemental financial transaction system of claim 10, in which:
   the web document object further comprises the financial institution identifier; and
   the financial transaction further comprises the financial institution identifier.

12. The supplemental financial transaction system of claim 10, in which:
   the secure web services system further defines a time period for which the unique redirect URL is valid; and
   the supplemental transaction server provides the web document object only in response to receiving a secure connection at the unique redirect URL during the time period defined by the secure web services system.

* * * * *